Patented Sept. 3, 1940

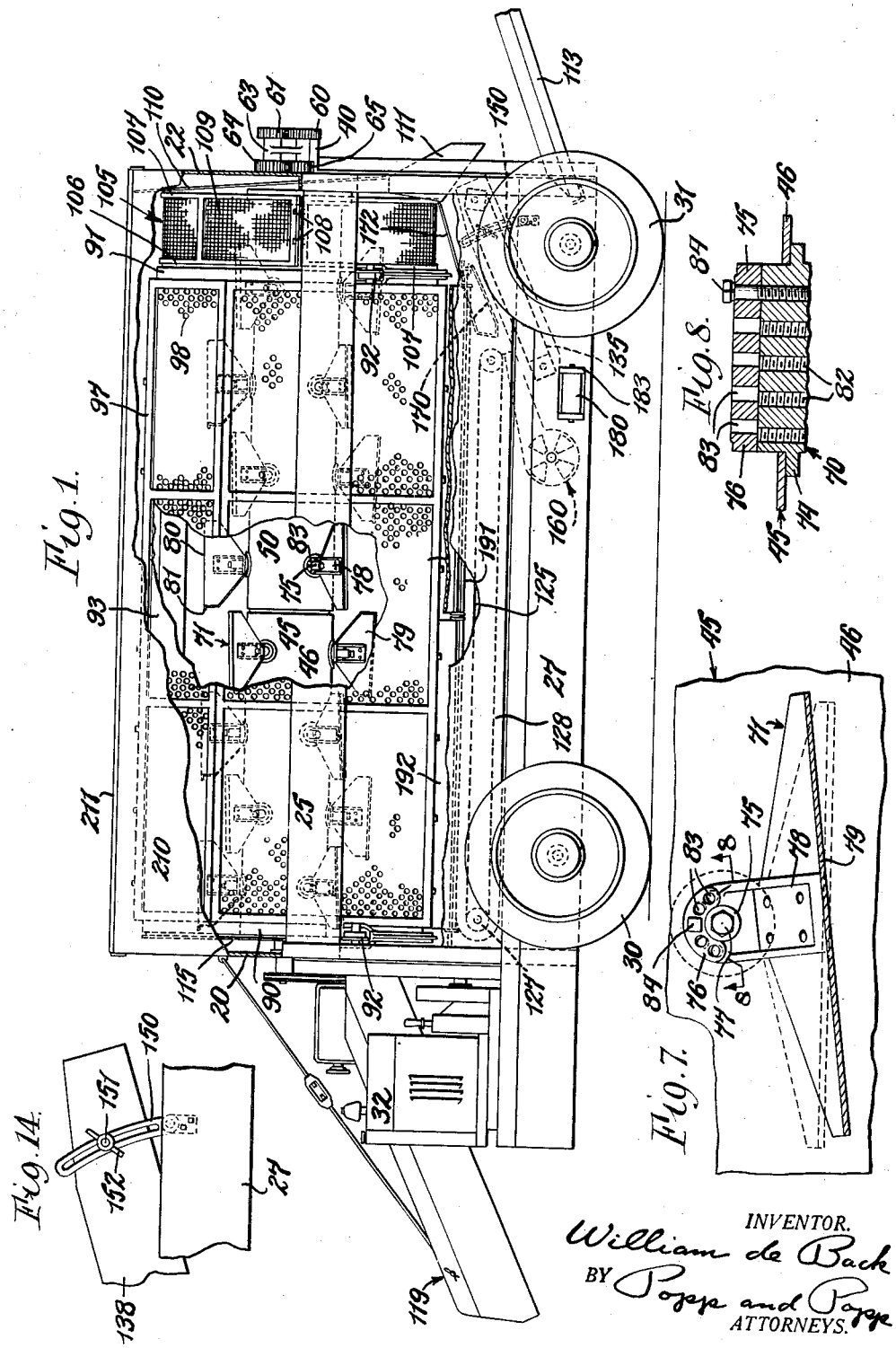

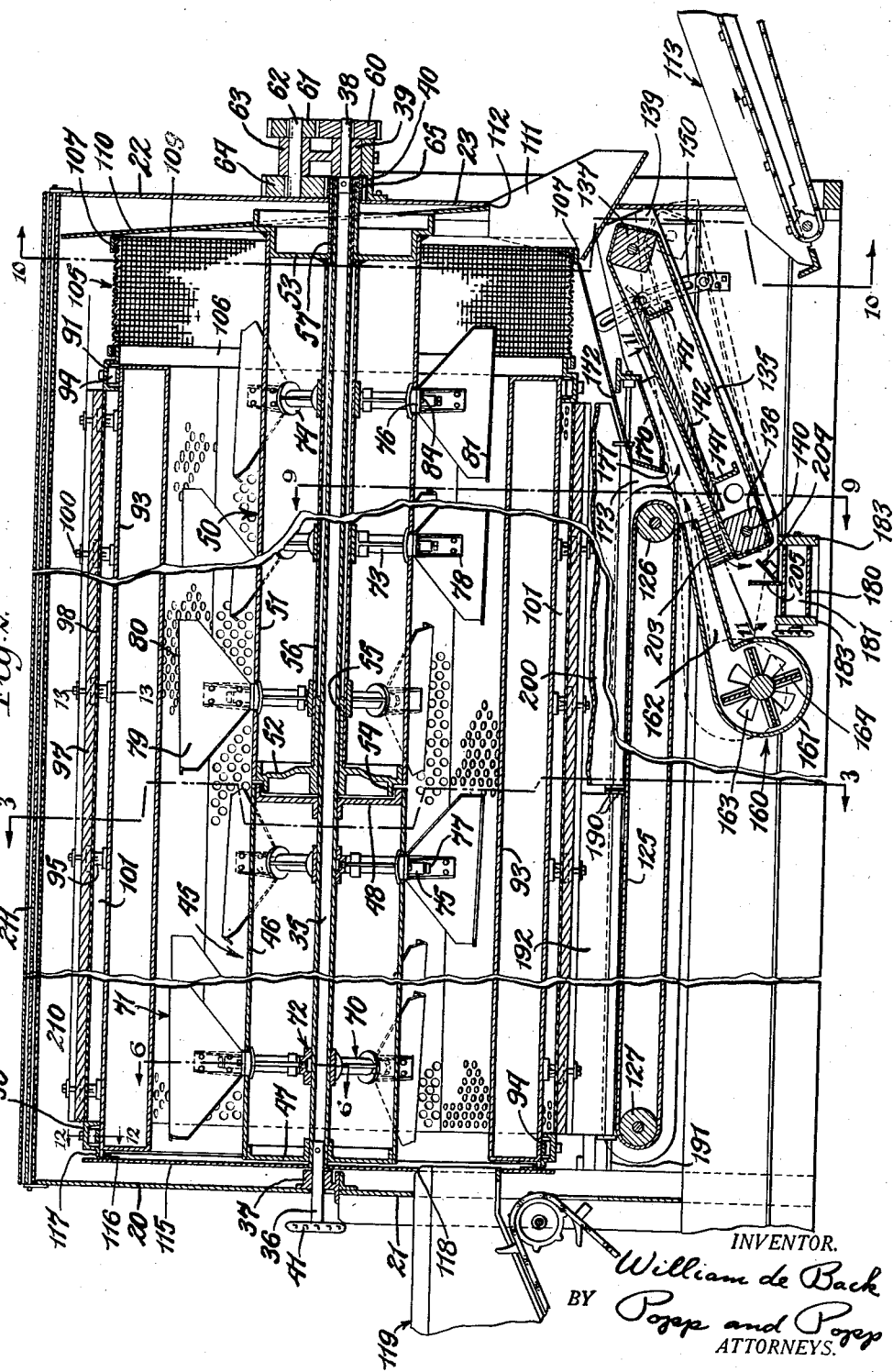

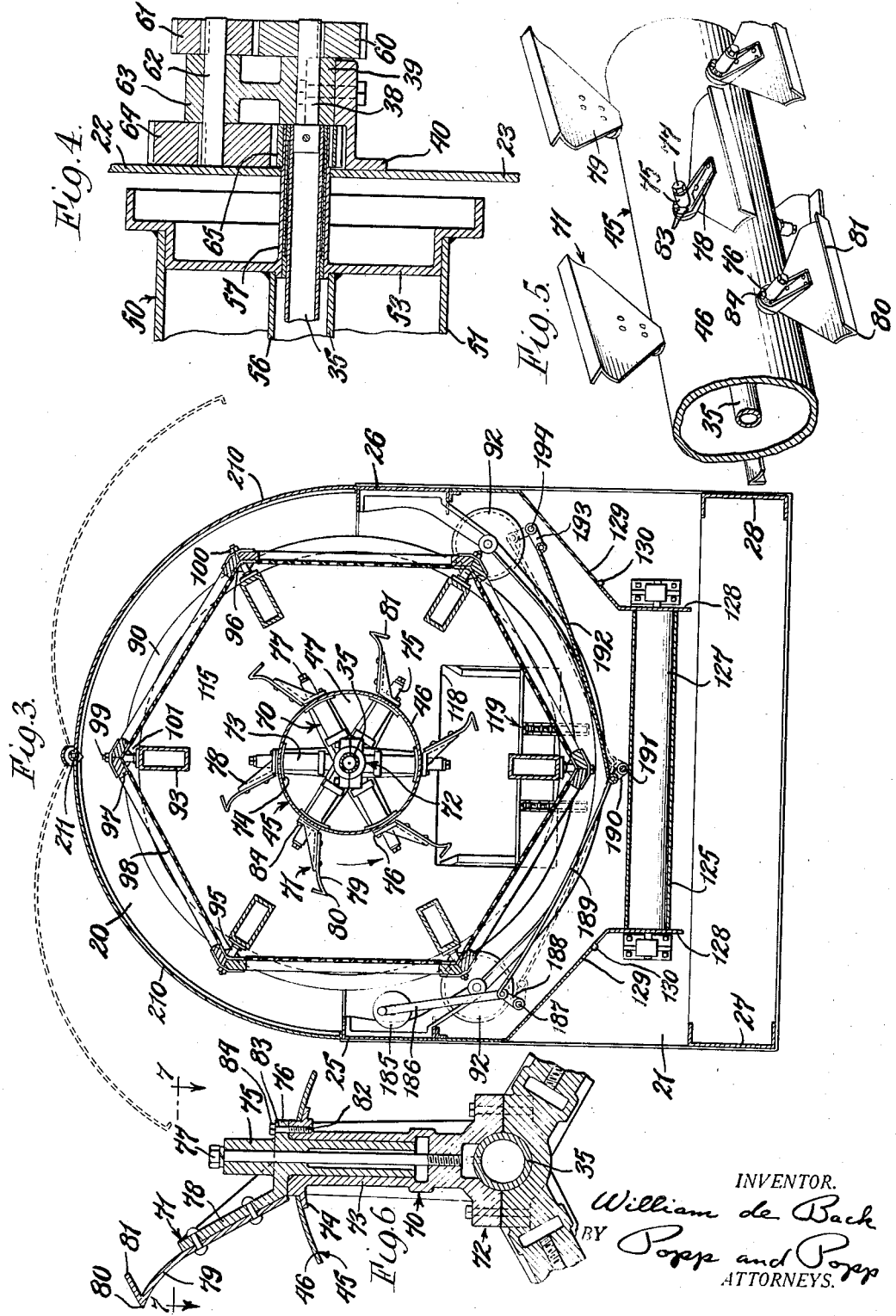

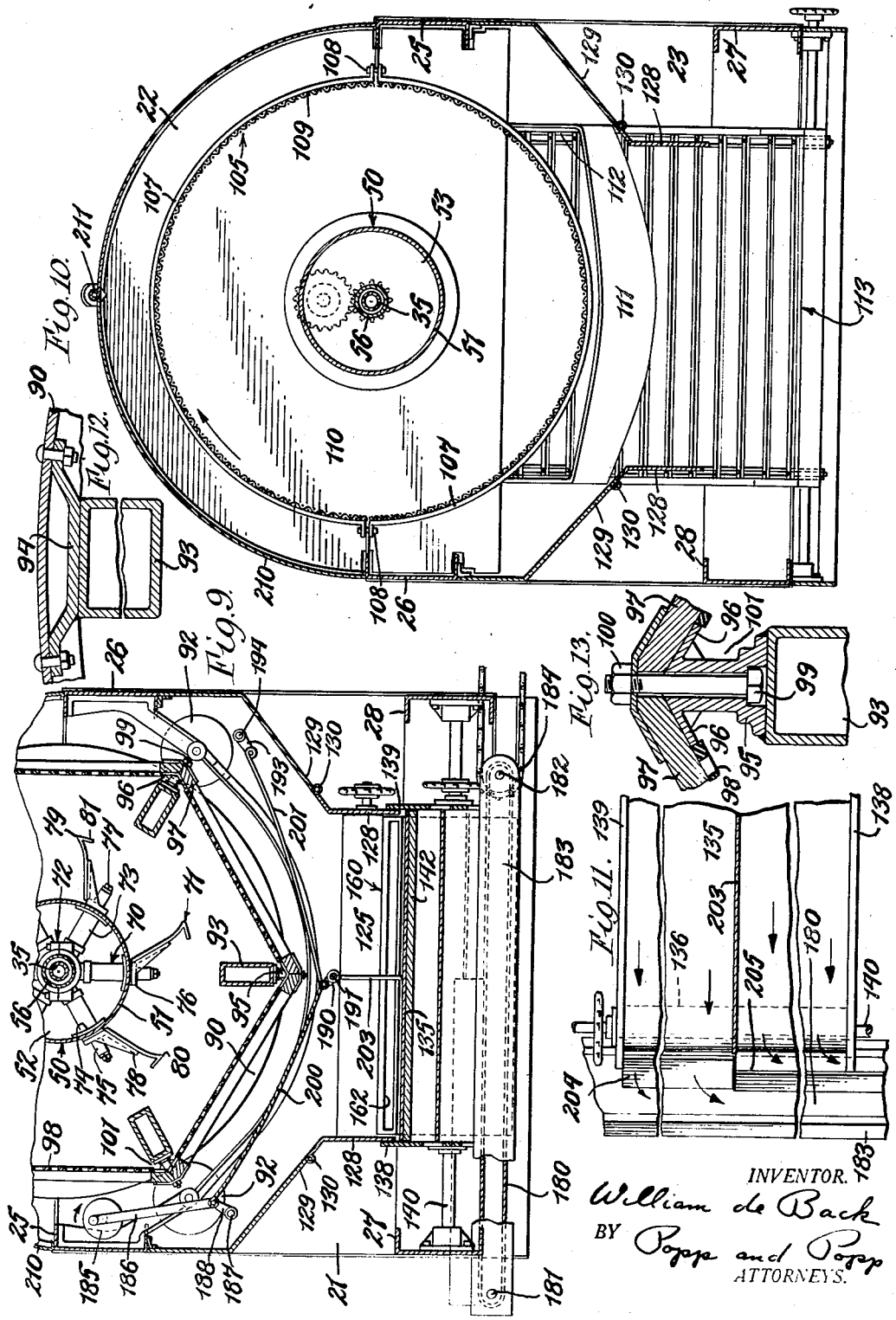

2,213,387

UNITED STATES PATENT OFFICE 2,213,387

VINER

William de Back, Niagara Falls, N. Y., assignor to Chisholm-Ryder Company, Incorporated, Niagara Falls, N. Y., a corporation of New York Application November 15, 1937, Serial No. 174,605

16 Claims. (Cl. 130—30)

This invention relates to viners such as are used to thresh green peas and lima beans for commercial packing. The vines having been cut in the field with a mowing machine are fed into the viner and the peas or lima beans are removed while the pods are still attached to the vines.

In viners of the general class to which this invention relates the principle of impact is employed to remove the peas or lima beans from the pods, the pea pods containing more or less air as well as peas. The impact causes distortion and produces a pressure within the pod that causes it to burst at its weakest point, where the two halves are joined. In operation, the vines with their pods are dropped onto an automatic feeder which feeds them into the reel of the viner. This reel is formed by longitudinal ribs which support perforated rubber screens to form a polygonal enclosure. The screens and ribs in rotating form pockets thereby causing the reel to act as a bucket elevator lifting the vines to a position near the top. As they reach sufficient elevation they slide off of the ribs and come into contact with rapidly revolving beaters attached to a beating cylinder housed within the reel. When they are first struck some of the pods are opened and the vines acquire the speed of the beaters and are thrown against other lifting ribs where more pods are opened by impact. The beaters are adjustably set at an angle to the axis of the beater cylinder so that the vines are gradually propelled along the cylinder. By the time they have reached the discharge end of the cylinder substantially all of the pods have been opened. The separated peas or lima beans fall to the bottom of the reel as soon as they are released from the pod and pass through the perforations in the rubber screens onto means arranged below the reel which separates the peas or lima beans from the chaff and separately discharge the same.

One of the principal objects of this invention is to provide such a viner having improved efficiency in operation and production by insuring a uniformity in the distribution of the threshing the full length of the reel and also to provide a viner which is so designed that there is a reduction in the damage to tender peas and a smaller number of splits produced, particularly in the tender peas, thereby increasing the production of fancy peas.

Another object is to provide a viner which is fabricated of pressed steel parts reinforced with structural steel.

Another aim is to provide such a viner of high capacity which is of greatly reduced height and also has a low center of gravity which is below the center line of the viner. This not only reduces the cost of the viner and renders all parts of the viner more accessible and facilitates cleaning of the same, but also permits of rendering the viner portable by mounting it upon wheels.

Another purpose of the invention is to eliminate all of the canvas curtains such as are now usually employed to enclose the viner and to substitute therefor hinged metal closures which can be readily opened or removed for the purpose of inspecting or cleaning the viner.

Another object is to provide a much more gentle threshing action at the feed end of the reel as compared with the discharge end so that the tender peas are threshed out by gentle blows delivered at slow speed before the vines and pods pass on to the discharge end of the reel where more violent threshing action takes place to thresh out the more matured peas. This results in a reduction of injury to and splitting of the tender peas with a consequent greater production of fancy peas and is accomplished, in accordance with the present invention, by dividing the beater cylinder into two sections and rotating that section in the inlet end of the reel at a lower speed than that section located in the discharge end of the reel.

Another object of the invention is to provide an improved means for mounting the beaters on the beater cylinder so that they can be readily adjusted as to pitch and in particular to permit of adjusting the beaters mounted on the high speed section of the beater cylinder to have a greater pitch than the beaters mounted on the low speed section of the beater cylinder.

Another aim of the invention is to provide improved means for feeding the vines into the inlet end of the reel by extending the longitudinally lifting ribs thereof into the circle or track which forms the mouth of the reel. By this means the vines are drawn into the reel by the coaction of the extended ribs and the beaters at the inlet end of the machine.

Another object of the invention is to mount the longitudinal lifting ribs of the reel in spaced relation to the screens supported thereby so that a space is provided through which peas can roll along the screens. Without such a space the peas which do not escape through the rubber screens would be lifted by the pockets formed by the lifting ribs and brought back into the zone of action of the beaters with consequent unnecessary injury to these peas. By so spacing the ribs from the screens this is avoided since such peas merely roll along the screen surface of the reel until they escape.

Another aim of the present invention is to provide a narrow horizontal endless conveyer under the reel which receives the separated peas and chaff and conveys them longitudinally of the axis of the reel to the discharge end of the machine where they are dropped upon an inclined separating apron. This greatly reduces the height of the viner since the practice heretofore has been to drop the peas directly onto a separating apron which necessarily was required to have a width equal to the length of the reel and which, to be set at the proper angle for chaff separation, required the mounting of the reel in an elevated position.

Another purpose of the invention is to provide baffles under the reel for catching the separated peas and chaff and directing them onto the narrow endless conveyer above referred to.

Another object is to so arrange auxiliary baffles that the auxiliary baffles under the feeding end of the reel deliver the peas to one side of the narrow conveyer, whereas the baffles at the discharge end of the reel deliver the peas to the opposite side of the conveyer. Since the tender peas are threshed out at the inlet end of the reel it will be seen that this provides a means for grading the peas as to quality, the tender peas being discharged separately from the more matured peas. These auxiliary baffles are also preferably shaken to prevent chaff from lodging thereon.

Another object of the invention is to provide a compact and simple separating apron onto which the peas and chaff from the narrow endless conveyer are discharged, the peas rolling down this apron and the chaff itself being carried along with the apron and discharged at the upper end thereof. This separating apron is vibrated and also is readily adjusted as to inclination so as to adjust its separating action.

Another object of the invention is to arrange the chaff discharge end of the separating apron adjacent the hay discharge end of the viner, so that the hay and chaff are discharged at the same place and more readily handled.

Another object of the invention is to provide a blower which delivers a current of air upwardly along the upper stretch of the separating apron so as to facilitate the separation of the chaff from the peas and insure the removal of substantially all the chaff therefrom. This blower also serves to aerate the peas as they are being separated from the chaff, this aeration drying any juices on the peas and reducing the danger of subsequent heating and fermentation.

Another object of the invention is to arrange a baffle over the separating apron which, in combination with the blower outlet, produces a sustained and strong current of air over the upper stretch of the separating apron and also produces a suction which draws upon the chaff contained upon the narrow endless horizontal conveyer and insures the complete removal of all chaff and peas therefrom.

Another aim is to provide a means for maintaining the separation of the tender peas from the hard peas while traversing the separating apron.

Another object of the invention is to mount a cylindrical salvage screen on the discharge end of the reel in which the straw is loosened and separated so that any entrained peas can fall therefrom and pass out through the mesh of the salvage screen. This salvage screen is preferably made of metal.

Another object of the invention is to provide a baffle which acts as a back feed for the peas delivered from the salvage screen at the same place as the peas delivered by the narrow horizontal endless conveyer.

In the accompanying drawings:

Fig. 1 is a side elevation of a viner embodying my invention, parts thereof being broken away to disclose the operating mechanism.

Fig. 2 is a fragmentary vertical longitudinal section therethrough.

Fig. 3 is a vertical transverse section, taken on line 3—3, Fig. 2.

Fig. 4 is an enlarged view similar to Fig. 2 and showing in detail the gearing interposed between the two sections of the beater cylinder to secure a differential in the speed thereof.

Fig. 5 is a fragmentary perspective view of one of the beater cylinder sections.

Fig. 6 is a vertical fragmentary section through the beater cylinder, taken on line 6—6, Fig. 2 and showing in detail the manner in which the pitch of the beaters can be adjusted.

Fig. 7 is a fragmentary horizontal section, taken on line 7—7, Fig. 6.

Fig. 8 is a vertical fragmentary section, taken on line 8—8, Fig. 7.

Figs. 9 and 10 are vertical fragmentary transverse sections, taken on the correspondingly numbered lines on Fig. 2.

Fig. 11 is a fragmentary horizontal section, taken on line 11—11, Fig. 2, looking downwardly.

Figs. 12 and 13 are vertical fragmentary sections, taken along the correspondingly numbered lines on Fig. 2.

Fig. 14 is a fragmentary side elevation of the means for adjusting the inclination of the separating apron.

The supporting frame for the viner includes an end head at the feeding end of the machine and an end head at the discharge end. The end head at the feeding end includes an upper sheet metal semi-circular plate 20 and a lower rectangular plate 21, these plates being suitably reinforced by means of structural members and similarly the end head at the discharge end of the machine includes an upper semi-circular plate 22 and a lower rectangular plate 23, both of which are suitable reinforced by structural steel. The end heads so formed are cross connected by upper longitudinal side channels 25 and 26 and by lower side channels 27 and 28.

The viner can be supported by rear wheels 30 and front steering wheels 31, the frame being preferably supported on the central part of the axle of the front steering wheels 31 by a king pin or the like so that the frame has a three point suspension and is not subject to strain on being drawn across rough fields. The power for operating the moving parts of the viner is preferably supplied from a gas engine 32 mounted at the feeding end of the viner, the channels 27 and 28 being preferably extended to support a platform for the gas engine 32, as best shown in Fig. 1.

The beater mechanism is supported and driven by a tubular shaft 35. This shaft is pinned at one end to a shaft 36 which is journaled in a bearing 37 in the end head 20, 21 at the feeding end of the machine and at its other end is pinned to a similar short shaft 38 supported in a bearing 39 mounted on a bracket 40 carried by the rear end head 22, 23 of the machine. The tubular shaft 35 is rotated by means of a sprocket 41 secured to the short shaft section 36 and driven from the gas engine 32 in any suitable manner (not shown).

The beater cylinder carried by the shaft 35 is divided into two sections, one of which is directly secured to the shaft 35 and the other of which is secured to a tubular shaft which surrounds the shaft 35 and is supported by bearings interposed therebetween and driven at a different speed. The beater cylinder section directly connected to the shaft 35 is indicated generally at 45 and is located at the feeding end of the machine. This cylinder comprises a cylindrical sheet metal body 46 secured at one end to a circular end head 47 and at its other end to a circular end head 48, both of these end heads being secured to the tubular shaft 35. The other beater cylinder section, indicated generally at 50 comprises a sheet metal cylindrical body 51 which is secured at one end to a circular end head 52 and at its other end to a circular end head 53. The end head 52 is preferably provided with a flange 54 which enters the end head 48 so as to prevent chaff from entering between these two end heads and the end head 52 is provided with an extended hub 55 which is journaled on the tubular shaft 35 and around which a tubular shaft 56 is secured. The other end of this tubular shaft 56 is welded to the end head 53 which is provided with an extended hub 57 journaled upon the tubular shaft 35 and projecting beyond the end head 22, 23 of the machine.

The means for driving the beater cylinder sections 45, 50 at different speeds comprises a gear 60 keyed to the short shaft section 38 and driving a pinion 61 which is keyed to a counter shaft 62, this shaft being journaled in a bearing 63 formed integrally with the bearing 39, as best shown in Fig. 4. The counter shaft 62 drives a gear 64 which in turn drives a gear 65 secured to the hub 57 of the end head 53. It will therefore be seen that as the shaft 35 is turned to rotate the beater cylinder section 45 at a predetermined speed, the gearing 60, 61, 64 and 65 drives the end head 53 of the other beater cylinder section 50 at a greater speed.

Each of the beater cylinder sections 45 and 50 is internally reinforced by a plurality of spiders, indicated generally at 70, the arms of which also form the means for adjustably supporting the beaters, indicated generally at 71. The spiders 70 are shown as being substantially identical in construction and therefore a description of one will be deemed to apply to all of the spiders.

Each spider comprises a hub 72 from which three tubular arms 73 radiate. To facilitate the application of the spiders to the tubular shafts 35 and 56 the hub 72 of each spider is preferably of split form, as shown in Fig. 6, and the two parts secured together in any suitable manner so as to clamp the tubular shaft therebetween. At the outer end of each of the arms 73 a flange 74 is provided which supports the sheet metal cylindrical shell of the beater cylinder and each of the arms 73 projects through an opening provided in the shell. Each of the arms is provided with a longitudinal bore, this bore receiving a tubular support 75 for the corresponding beater. This tubular support is provided near its outer end with a flange 76 which is held against the end of the corresponding beater arm 73 by a tie screw 77, this tie screw extending axially through the tubular support 75 and having threaded engagement with the inner end of the spider arm, as best shown in Fig. 6. Formed integrally with the tubular beater support 75 is a bracket 78 which is formed to provide a flat face disposed at an angle to the axis of the tubular support. The beaters are in the form of sheet metal plates 79 and each is secured against the flat face of a corresponding bracket 78 in any suitable manner. The outer end of each of the sheet metal beater plates 79 preferably curves forwardly to provide a leading nose 80 from which the beater plate is bent in a reverse direction to provide a reinforcing flange 81.

In order to permit of adjusting the pitch of each of the beater plates 79 the end of each of the spider arms 73 is provided with an annular series of threaded holes 82 which register with a corresponding series of holes 83 provided in the supporting flange 76 of each tubular beater support 75. A screw 84 extends through a corresponding pair of holes 82 and 83 and by removing these screws it will be seen that the beater plates 79 can be set to any desired pitch and held in this position by replacing the screws 84 in the corresponding registering openings 82, 83.

As previously briefly explained the beater cylinder sections revolve within a reel. This reel includes a pair of circular end rings 90, 91 which are in the form of steel channels, the flanges thereof extending inwardly and the outer faces thereof forming tracks which ride upon supporting rollers 92, these rollers 92 being mounted on the frame of the viner in any suitable manner. The end rings 90, 91 of the reel are shown as connected by six lifting ribs 93. These lifting ribs are preferably six in number and each is preferably made of sheet steel and of closed box form. The ends of the lifting ribs are suitably welded to short bars or straps 94 the legs of which are suitably secured to the inside of the end rings 90 and 91, as best shown in Fig. 12. By this means the lifting ribs are located inside of these end rings 90, 91 and the ends of the lifting ribs at the inlet end of the reel extend to the end face of the ring 90 for a purpose which will presently appear.

At spaced intervals along the outer face of each lifting rib 90 spacer sleeves 95 are welded, these spacer sleeves being best illustrated in Fig. 13. At the outer end of each spacer sleeve 95 angular flanges 96 are provided which support the frames 97 of the rubber screens 98 which enclose the reel. The inner end of each of the spacer sleeves 95 is enlarged to receive the head of a bolt 99, the shank of which projects beyond the screen frames 99 so that a nut 100 can be employed to hold the screen frames in position against the flanges 96 of the spacers. It will be seen that the spacer sleeves 95 provide a space 101 between the screen frames and the supporting ribs, which space permits peas or lima beans to escape from the buckets formed by the lifting ribs and screens as the reel rotates. Any suitable means (not shown) can be provided for rotating the reel in the same direction as the beater cylinder sections, but at a slower speed, it being desirable to also provide means for adjusting the speed of the reel relative to the beaters.

At the outlet end of the reel a cylindrical salvage screen 105 is attached. For this purpose a circular band 106 is welded to the end ring 91, and on this ring are secured two semi-circular sections 107 of the salvage screen frame, these sections being bolted together around the band 106 by means of bolts 108, as best illustrated in Fig. 10 or in any other suitable manner. The semi-circular screen frames 107 are screened with wire mesh screening 109 which can be of the woven wire type or of the perforated metal type. The purpose of the salvage screen 107 is to permit the straw to be separated and any entrained peas to fall therefrom. Any peas which are thrown out of the end of the salvage screen strike an inclined baffle plate 110 which returns the peas into the screen through the meshes of which the peas escape.

The straw from the salvage screen escapes through an outlet chute 111 the upper end of which is located under the discharge end of the salvage screen and which conducts the straw through an outlet opening 112 in the end head section 23 of the viner frame and discharges the straw onto a straw carrier indicated generally at 113. This straw carrier can be of any usual and well known construction, its principal function being to stack the straw at a distance from the viner.

At the inlet end of the reel a stationary plate 115 is mounted, this plate enclosing the inlet end of the reel. To prevent the escape of chaff this plate is provided on one side with a circular flange 116 which is located within a circular flange 117 welded to the end face of the end ring 90, as best illustrated in Fig. 2. The plate 116 is provided with an opening 118 which is located at the lower end of the reel and in line with the rotating lifting ribs 93. The vines from the field are loaded on a feeder, indicated generally at 119, which can be of any usual construction and this feeder discharges the vines toward the opening 118 where the vines are picked up by the coaction of the lifting ribs 93 and the beater plates 79 at the inlet end of the machine and drawn into the reel. It has been found that the extension of the lifting ribs 93 to the end faces of the rings 90 materially facilitates the transfer of the vines from the feeder to the reel as compared with former viners where the lifting ribs extended between the end rings but not inside of the same.

The peas falling through the rubber screens 98 of the reel fall onto a narrow endless conveyer belt 125. The stretches of this conveyer belt are horizontally disposed and pass around a drive roller 126 which is located adjacent the discharge end of the reel and a driven roller 127 at the feed end of the viner. The conveyer belt 125 can be made of any suitable material, such as canvas, and its supporting rolls 126 and 127 can be journaled on the viner frame in any suitable manner. The horizontal conveyer belt 125 is narrower than the reel and in order that all of the peas falling from the reel are conducted to the conveyer belt 125 the sides of the conveyer belt 125 are enclosed by vertical plates 128 to the upper edge of each of which a panel 129 is hinged, as indicated at 130. It will be understood that the panels 129 can be made in sections if desired and these panels slope outwardly and are detachably secured in any suitable manner (not shown) to the longitudinal channel bars 25 and 26, as best illustrated in Fig. 3. By this means the panels 129 and plates 128 form, in effect, a funnel which conducts all peas escaping from the sides of the reel onto the comparatively narrow conveyer belt.

The peas or lima beans, together with the chaff, is discharged from the conveyer belt 125 upon a separating apron 135 which is inclined at such a degree that the peas or lima beans roll down the apron, whereas the chaff is carried up the apron and is discharged onto the straw carrier 113. For this purpose the separating apron is in the form of an endless belt, of canvas or the like, and passes at its opposite ends around square rollers 136 and 137, the upper roller being journaled in side plates 138 and 139 and the lower roller 136 being loosely mounted on a shaft 140 which is journaled on bearings mounted on the main frame and on which the side plates 138 and 139 are pivoted. The square rollers 136 and 137 are preferably set with their faces at a 45° angle to one another and it will be seen that as they rotate the stretches of the endless separator apron are vibrated so as to assist the downward movement of the peas or lima beans which is, of course, counter to the movement of the apron. The side plates 138 and 139 are cross connected by channels 141 and these channels preferably support a cross plate 142 against which the upper stretch of the apron vibrates so that an additional bouncing action is provided to assist the downward movement of lima beans. It is desirable to keep the upper operative stretch of the conveyer apron 135 comparatively taut and for this purpose power is preferably applied to the upper square roll 137.

Since the cross connected side plates 138 and 139 form the means for supporting the separating apron 135 and since these plates are mounted to pivot about the shaft 140 it will be seen that the inclination of the separating apron can be readily adjusted. Any suitable means can be employed for accomplishing this purpose, the means shown in Fig. 14 comprising a slotted bar 150 pivotally mounted on a stationary part of the viner and a stud 151 extending out from the side of one of the side plates 138 or 139 and into the slot so that upon tightening a wing nut 152 on the stud 151 the frame which supports the separator apron can be held at any desired inclination. By this means the apron can be readily adjusted to handle both peas and lima beans and secure the efficient separation of chaff in both cases.

The side plates 138 and 139 are extended forwardly from the lower square roller 136 to provide the sides of a blower, indicated generally at 160. To this end the forwardly extending ends of these sideplates are made scroll shaped and are connected by a sheet metal scroll 161 which is also formed to provide a discharge duct 162. Air inlet openings 163 are provided for the fan housing thus formed and a fan 164 of any suitable form is journaled in this fan housing and is driven in any suitable manner. The air from the discharge duct 162 is directed against the upper side of the separating apron 135 in advance of the discharge from the horizontal conveyer belt 125, this blast of air serving to blow the light chaff up the separator apron and also serving to aerate the peas or lima beans. This aeration not only cleans the peas and lima beans but also serves to dry the juices thereon, the drying of these juices reducing the danger of subsequent fermentation and heating of the peas or lima beans before they are packed. In order to increase the effect of the air discharged from the discharge duct 162 and provide a stronger blast of air up the separating apron 135 and also to draw the chaff and peas from the horizontal conveyer by suction a plate is provided for accomplishing these purposes. This plate consists of an inclined portion 170 overlaying the upper stretch of the separating apron 135 and a forwardly flaring portion 171. From the mouth the plate extends upwardly and rearwardly as indicated at 172 and terminates adjacent the discharge chute 111, thereby to additionally provide a chute for conducting the salvaged peas from the salvage screen 105 forwardly to the same place of discharge as the peas delivered by the horizontal conveyer 125. By virtue of the flaring portion 171 a strong blast of air is created between the plate 170 and the separator apron and at the same time the form of the plates 170, 171 provides a strong suction downwardly through the discharge space 173. The plate 170, 171, 172 can be either mounted to move with the frame supporting the conveyer apron or it can be stationarily mounted upon the frame of the viner, as indicated in the drawings. The peas or lima beans travel downwardly along the separating apron and are discharged onto a cross conveyer which is shown as comprising a canvas belt 180 supported by rollers 181, 182 carried between side bars 183 which are suitably secured to the viner frame. The roll 182 is shown as being driven by a sprocket 184 and the conveyer is arranged transversely of the viner so that the peas or lima beans discharged thereon from the lower end of the separating apron 135 are conducted to the side of the machine.

As previously set forth the purpose of dividing the beater cylinder into two sections 45 and 50 was to secure a gentle threshing of the tender peas and a more violent separation of the more matured peas. The peas falling from the reel at the feed end of the machine are therefore relatively tender as compared with the peas which are threshed out at the discharge end of the reel. The present invention also proposes a means for maintaining the separation of the tender peas from the more matured peas so that they can be subsequently separately handled and packed. It will be understood, of course, that this separation is in the nature of a rough classification rather than an accurate quality. For the purpose of securing this separation an eccentric disk 185 is suitably journaled on the frame of the viner and is driven by any suitable means. The pin of this eccentric disk is connected by a link 186 with a crank arm on a rock shaft, this rock shaft being suitably journaled on the viner frame and having a plurality of rock arms 188 attached thereto along its length. At the feed end of the reel the rock arms 188 are attached to links 189 which extend downwardly under the reel and at their opposite ends connect with rock arms 190 secured to a rock shaft 191, this rock shaft 191 being journaled at its ends on the viner frame and being arranged immediately above the centerline of the horizontal endless conveyer 125. These rock arms 190 at the feed end of the viner additionally connect with a plate 192 which is pivotally supported at its upper edge on rock arms 193 of a rock shaft 194, this rock shaft 194 being also journaled on the viner frame. It will be seen that as the eccentric disk 185 rotates the reciprocating action of the links 186 and 189 reciprocates the plate 192 so that even though this plate has a comparatively slight inclination the chaff and peas which drop from the reel onto this plate are carried down to the conveyer belt. Since the plate 192 is arranged under the feed end of the reel only and since the peas dropping thereon are the comparatively tender peas it will be seen that substantially all of the tender peas are delivered to one side of the horizontal endless conveyer 125.

At the discharge end of the viner the position of the deflector plate is reversed so that the matured peas threshed out at the discharge end of the reel are delivered to the opposite side of the horizontal endless conveyer 125. For this purpose the deflector 200 under the discharge end of the reel is supported by the rock arms 188 and 190 and the rock arms 190 are connected to the rock arms 193 by links 201. It will therefore be seen that the matured peas falling from the discharge end of the reel either fall directly on the opposite side of the conveyer belt 125 from that receiving the tender peas or fall upon the deflector 200 which conducts the peas to this opposite side of the belt. The tender and more matured peas are therefore conveyed in separate processions on the opposite sides of the conveyer belt 125 and are separately discharged onto the separating apron 135. To insure the maintenance of the separate identity of the two groups of peas a stationary partition 203 is provided along the center of the separating apron 135. When the more matured peas are discharged from the separating apron they engage a baffle 204 which conducts them to the left hand side of the transverse conveyer 180, as viewed in Fig. 2, and the tender peas are prevented from falling upon this side of the conveyer by a vertical stationary baffle 205 and therefore are discharged from the right hand side of the transverse conveyer 180, as viewed in Fig. 2. By this means a rough separation of the peas as to quality is obtained as a part of the threshing operation.

Instead of the usual canvas curtains generally employed for enclosing the viner this enclosure is preferably effected by a plurality of sheet metal plates 210 which are suitably hinged to the back 211 of the viner frame in any suitable manner and which are secured at their lower edges to the channels 25 and 26, the operating parts of the viner being thereby adequately protected from the weather and at the same time being readily accessible for cleaning of the viner.

*Operation*

The harvested vines with the pods attached are brought to the viner and are fed to the feeder 119, the endless conveyer of which delivers the vines continuously to the inlet opening 118 in the stationary plate 115. In operation the reel is rotated in a clockwise direction, as viewed from the feed end of the machine, and the beater cylinder sections 45 and 50 are likewise rotating in a clockwise direction but at a greater speed. The beater cylinder sections are rotated through power applied to the sprocket 41 which turns the shaft 35 on which the first beater cylinder section 45 is directly mounted and through the step-up gearing 60, 61, and 40 this shaft 35 rotates the second beater cylinder section 50 at a higher speed than the beater cylinder section 45. The beaters 79 of the two cylinder sections are all set at a pitch which conveys the vines lengthwise of the reel to the discharge end thereof and the beaters of the second beater cylinder section 50 are preferably set to have a greater pitch than those mounted on the first beater cylinder section 45. This adjustment of the beaters is effected by removing the screw 84 at the base of each beater and turning the beater to provide the desired pitch after which the screw 84 is replaced, the screw engaging any one of a series of the holes 82 provided in the end of each spider arm 73.

The vines fed to the inlet opening 118 are caught by the adjacent ends of the lifting ribs 93 and the first series of beaters 79. These vines are therefore drawn into the reel. As the reel rotates the lifting ribs 93 form pockets which allow the reel to act as a bucket elevator, lifting the vines to a position near the top of the reel. As they reach a sufficient elevation, the vines slide out of the buckets and come into contact with the rapidly revolving beaters 79. This opens some of the pods and having acquired the speed of the beaters the vines are then thrown against other lifting ribs 93 where more pods are opened by the impact. Since the beater cylinder section 45 is rotated at a slower speed than the beater cylinder section 50 the action of the first series of beaters 79 is relatively gentle and serves to thresh out only the more tender peas. The separated peas are caught by the reel and since the reel is enclosed by the rubber screens 98, these peas fall through the perforations of the reel. It will be noted that the lifting ribs 93 are spaced from the reel screen frames by the spacing sleeves 95 and therefore any peas which are thrown against the top of the reel are not returned to the zone of action of the beaters by the lifting ribs 93 but roll down between the lifting ribs 93 and the screen frames until they fall through the perforations of the rubber screens 98.

Because of the pitch or angle of the beaters 79 the vines are moved toward the discharge end of the reel each time the beating cycle is repeated. The beaters on the first beater cylinder section 45 therefore deliver the partly threshed vines to the beaters 79 of the second beater cylinder section 50 and the same threshing action is continued. Since, however, the second beater cylinder section 50 is rotated at a higher speed the threshing action is more violent and the impact of the beaters serves to thresh out the more matured peas. These more matured peas fall through the rubber screens 98 of the reel in the same manner as the tender peas. The threshed vines are then delivered by the last series of beaters 79 into the salvage screen 105. Since the endmost series of beaters extend only partly into the salvage screen 105 the vines are permitted to spread out and any peas entrained in the vines are permitted to fall through the vines and through the metal screening of the salvage screen. Any such peas which are thrown toward the discharge end of the viner by the last series of beaters 79 hit the inclined baffle 110 and are returned into the salvage screen. The salvage screen 105 rotates with the reel. The threshed vines, or straw, fall from the open end of the salvage screen 105 into the broad discharge chute 111 from which they fall onto the straw carrier 113 which stacks the threshed vines.

The tender peas falling through the feed end of the reel are all conducted to the left hand side of the horizontal conveyer belt 125 as viewed in Fig. 3. This is effected by the plate or baffle 192 which blocks off the opposite side of the horizontal conveyer belt 125. This baffle plate 192 is shaken by its mounting on the rock arms 190 and 193 of the rock shafts 191 and 194 respectively, the rock arms 193 being rocked by the connecting links 189, 186 which are reciprocated by the eccentric wheel 185, as best shown in Fig. 3. The peas and chaff falling upon the plate 192 are therefore delivered to the left hand side of the horizontal conveyer belt 125, as viewed in Fig. 3.

The peas falling from the discharge end of the reel and which have been subjected to the more rapidly rotating beaters 79 and hence are more mature, are conducted to the right hand side of the horizontal conveyer belt 125, as viewed in Figs. 3 and 9. This is effected by the baffle plate 200 which blocks off the left hand side of the conveyer belt 125 and is shaken by the eccentric wheel 185 in the same manner as the baffle plate 192. The tender and more matured peas are therefore discharged from the horizontal conveyer 125 onto the inclined separating apron as separate groups. The peas and chaff so discharged are drawn downwardly through the discharge opening 173 by the suction action of the plate 170, 171 which is in line with the discharge duct 162 of the fan 160. The light chaff is blown up the upper stretch of the separating apron 135 by the current of air created between the plate 170 and the upper stretch of the separating apron and the peas roll down the separating apron in a direction opposite to the movement of the apron and against the current of air delivered by the discharge duct 162. The separating apron 135 and the fan 162 are mounted upon a frame which pivots about the shaft 140 as an axis so that the angle of the separating apron can be adjusted to suit different conditions, such as handling peas or lima beans. This is effected by loosening the wing nut 152, as shown in Fig. 14, and raising or lowering the discharge end of the frame which carries the separating apron. The current of air discharged from the discharge duct 162 of the fan 160 also serves to aerate and dry the peas, thereby reducing the danger of subsequent fermentation and heating. Since the separating apron 135 passes around squared rollers 136 and 137 it is vibrated, the vibration of the upper stretch of the separating apron, in conjunction with the plate 142 causing the peas or lima beans to travel down the conveyer apron 135 in a direction counter to the movement of the apron. Since the upper drive roller 173 is located immediately under the straw discharge chute 111 the chaff falling from the separating apron falls onto the straw carrier 113 so that both the straw and the chaff are discharged in the same manner and at the same place. The separate processions of tender and more matured peas fall from the horizontal conveyer 125 on opposite sides of a stationary partition plate 203 and hence the separate identity of these two classes of peas are maintained. The more matured peas traveling along the far side of the partition 203, as viewed in Fig. 2, are deflected by the baffle 204 to the left hand side of the transverse discharge conveyer 180 and the tender peas on the near side of the partition 203 are caused to fall on the right hand side of the transverse conveyer 180, as viewed in this figure. Therefore the tender and more matured peas are separately discharged from the viner.

The relatively small number of peas falling from the salvage screen 105 travel down the plate 172 and fall upon the separating apron 135 which separates these peas from any chaff falling with them.

From the foregoing it will be seen that by the provision of the horizontal conveyer 125 and the relatively short separating apron 135 the overall height of the viner is greatly reduced and in actual practice this height is reduced from 11 feet, six inches to 8 feet, 6 inches for a viner of the same capacity. This reduction in the overall height of the viner also results in lowering the beater cylinder and the reel so that the center of gravity of the viner is below the centerline of the viner illustrated and it can readily be rendered portable as illustrated. Furthermore, it will be noted that by dividing the beater cylinder into two sections 45 and 50 a greater efficiency in production is obtained by more uniformly distributing the threshing action the full length of the reel, and by operating the first beater cylinder section at a lower speed the tender peas which are first threshed out are subjected to less injury with a consequent increase in production of fancy peas by the viner. It will further be noted that increased feeding efficiency is obtained by extending the lifting ribs 93 into and up to the end face of the reel ring 90 and that the mounting of these lifting ribs 93 in spaced relation to the screens 98 enclosing the reel permits peas caught in the buckets formed by these lifting ribs 93 to fall through the space between these ribs and the screens instead of being discharged into the zone of action of the beaters with unnecessary injury to such peas. It will further be seen that by the provision of the baffle plates 192 and 200 a rough separation of the tender peas from the more matured peas is obtained, the separate identity of these peas being maintained in their subsequent discharge upon the separating apron 135 and onto the transverse conveyer 180. With the arrangement shown the separating apron 135 can also be made very short and discharges the chaff on the straw carrier so that the discharge of the straw and chaff is effected at the same place. Furthermore the arrangement of the blower 160 as illustrated serves to draw the peas and chaff through the opening 173 onto the separating apron 135 and also serves to insure complete removal of all of the chaff from the peas as well as to aerate and partly dry the peas so as to reduce the danger of fermentation. The vibration of the separating apron also serves to insure rapid movement of the peas or lima beans down the apron while the chaff is carried up the apron thereby permitting of reducing the length of this apron. The metal salvage screen shown has also been found to effectively remove any entrained peas from the straw and by the back feed of such peas along the plate 172 they are conducted to the separating apron 135 in the same manner as the peas falling from the reel. It will also be noted that the viner shown is of all steel construction and that all canvas curtains or the like are eliminated by the use of sheet metal housing plates shown.

I claim as my invention:

1. A viner, comprising an overhead reel adapted to receive and convey the vines and pods attached thereto, means for threshing the vines being conveyed by said reel, a reel arranged under said reel and arranged to receive the materials threshed out of the vines including the chaff, a separator frame adjacent the discharge end of said conveyer, a pair of rollers mounted on said separator frame in different vertical planes and including a drive roller, an endless separating apron passing around said rollers whereby said apron is inclined, the lower end of said separating apron being arranged to receive the materials discharged from said conveyer, means for driving said drive roller to cause the upper operative stretch of said separating apron to travel upwardly whereby the chaff is discharged over the top of said apron and the other materials travel downwardly thereon, means for adjusting the inclination of said separator frame and a blower mounted on the lower end of said frame and having a discharge nozzle directing a stream of air upwardly along the operative stretch of said separating apron.

2. A viner, comprising a frame, an overhead generally horizontal reel carried by said frame and adapted to receive and convey the vines and pods attached thereto, means for threshing the vines being conveyed by said reel, an endless generally horizontal conveyer belt arranged under said reel and arranged generally parallel thereto, said conveyer belt being substantially narrower than said reel, an inclined baffle plate arranged at one side of said conveyer belt and directing the materials falling from that side of said reel onto said conveyer belt, a second inclined baffle plate arranged at the opposite side of said conveyer belt and directing the materials falling from the corresponding side of said reel onto said conveyer belt, means pivotally connecting the upper end of each of said baffle plates to the corresponding side of said frame, means pivotally connecting the lower ends of said baffle plates to one another, means for shaking said baffle plates to swing about their said pivotal connections, a chaff separator at the discharge end of said conveyer belt and receiving the threshed materials discharged from said conveyer belt and means for separately discharging the materials separated by said separator.

3. A viner, comprising an overhead generally horizontal reel adapted to receive and convey the vines and pods attached thereto, means for threshing the vines being conveyed by said reel, an endless generally horizontal conveyer belt arranged under said reel and arranged generally parallel thereto to receive the materials threshed out of the vines including the chaff, means for driving said conveyer to travel lengthwise of the axis of said reel, a chaff separator at one end of the viner and extending partly under the discharge end of said conveyer belt to receive the threshed materials from said belt, means interposed beween said reel and conveyer belt at the feed end of the viner for directing the relatively tender threshed materials onto one side of said conveyer belt, means interposed between said reel and conveyer belt at the discharge end of the viner for directing the more matured threshed materials onto the other side of the belt and means for maintaining the separate identity of said tender and more matured threshed materials after being so deposited on said conveyer belt.

4. A viner, comprising an overhead generally horizontal reel adapted to receive and convey the vines and pods attached thereto, means for threshing the vines being conveyed by said reel, an endless generally horizontal conveyer belt arranged under said reel and arranged generally parallel thereto, said conveyer belt being substantially narrower than said reel, means for driving said conveyer to travel lengthwise of the axis of said reel, inclined baffle plates arranged at the sides of said conveyer belt and directing the materials falling from the sides of said reel onto said conveyer belt, a chaff separator at the discharge end of said conveyer belt and receiving the threshed materials discharged from said conveyer belt and means for separately discharging the materials separated by said separator, the baffle plates at the feed end of the viner being arranged to direct the relatively tender threshed materials onto one side of the conveyer belt and the baffle plates at the discharge end of the viner being arranged to direct the more matured threshed materials onto the opposite side of said conveyer belt.

5. A viner, comprising an overhead generally horizontal reel adapted to receive and convey the vines and pods attached thereto, means for threshing the vines being conveyed by said reel, an endless generally horizontal conveyer belt arranged under said reel and arranged generally parallel thereto, said conveyer belt being substantially narrower than said reel, means for driving said conveyer to travel lengthwise of the axis of said reel, inclined baffle plates arranged at the sides of the conveyer belt and directing the materials falling from the sides of said reel onto said conveyer belt, a chaff separator at the discharge end of said conveyer belt and receiving the threshed materials discharged from said conveyer belt, means for separately discharging the materials separated by said separator, the baffles plates at the feed end of the viner being arranged to direct the relatively tender threshed materials onto one side of the conveyer belt and the baffle plates at the discharge end of the viner being arranged to direct the more matured threshed materials onto the opposite side of said conveyer belt and means for maintaining the separate identity of said two classes of threshed materials while traversing said chaff separator.

6. A viner, comprising an overhead generally horizontal reel adapted to receive and convey the vines and pods attached thereto, means for threshing the vines being conveyed by said reel, an endless generally horizontal conveyer belt arranged under said reel and arranged generally parallel thereto, means for driving said conveyer to travel lengthwise of the axis of said reel, said conveyer belt being substantially narrower than said reel, inclined baffle plates arranged at the sides of said conveyer belt and directing the materials falling from the sides of said reel onto said conveyer belt, a chaff separator at the discharge end of said conveyer belt and receiving the threshed materials discharged from said conveyer belt, means for separately discharging the materials separated by said separator, the baffle plates at the feed end of the viner being arranged to direct the relatively tender threshed materials onto one side of the conveyer belt and the baffle plates at the discharge end of the viner being arranged to direct the more matured threshed materials onto the opposite side of said conveyer belt and means for shaking said baffle plates transversely of the axis of said reel.

7. A viner, comprising a screened reel having an inlet end adapted to receive vines with attached pods and an outlet end through which the straw is discharged, a beater cylinder rotatably mounted in said reel coaxially therewith, a plurality of beaters mounted on said beater cylinder and acting to thresh and convey the vines through said reel, said beater cylinder being divided into sections rotatable relative to one another, and means for driving the beater cylinder section at the outlet end of the reel at a higher speed than the section at the inlet end thereof thereby to thresh out the tender materials with less injury thereto, said driving means comprising a shaft extending coaxially through said beater cylinder, a tubular shaft surrounding a portion of said first shaft, gearing connecting said shafts to drive them at different speeds and comprising a counter shaft journalled on a stationary part of the viner parallel with said first shafts, a pair of gears fast to said counter shaft and a gear on each of said first shafts and meshing with one of the pair of gears on said counter shaft, means for driving one of said shafts, means for securing one of said beater cylinder sections to one of said shafts and means for securing the other beater cylinder section to the other shaft.

8. A viner, comprising a screened reel having an inlet end adapted to receive vines with attached pods and an outlet end through which the straw is discharged, a shaft extending coaxially through said reel, means for driving said shaft and a beater assembly mounted on said shaft within said reel and acting to thresh and convey the vines therethrough, said beater assembly comprising a plurality of spiders mounted on said shaft, the radially extending arms of which are of tubular form, a cylindrical shell supported by said arms adjacent the outer ends thereof, and a plurality of beaters, each of said beaters including a supporting stem rotatably mounted in the corresponding tubular arm of one of said spiders and means for adjustably rotating said stems relative to each arm.

9. A viner, comprising a screened reel having an inlet end adapted to receive vines with attached pods and an outlet end through which the straw is discharged, a shaft extending coaxially through said reel, means for driving said shaft and a beater assembly mounted on said shaft within said reel and acting to thresh and convey the vines therethrough, said beater assembly comprising a plurality of spiders mounted on said shaft, the radially extending arms of which are of tubular form, a cylindrical shell supported by said arms adjacent the outer ends thereof, and a plurality of beaters, each of said beaters including a supporting tubular stem rotatably mounted in the corresponding tubular arm of one of said spiders and means for adjustably rotating each stem relative to its spider arm, and including an axial screw having its head bearing against the outer end of said stem and threaded into the hub of the spider.

10. A viner, comprising a screened reel having an inlet end adapted to receive vines with attached pods and an outlet end through which the straw is discharged, a shaft extending coaxially through said reel, means for driving said shaft and a beater assembly mounted on said shaft within said reel and acting to thresh and convey the vines therethrough, said beater assembly comprising a plurality of spiders mounted on said shaft, the radially extending arms of which are of tubular form, a cylindrical shell supported by said arms adjacent the outer ends thereof, and a plurality of beaters, each of said beaters including a supporting tubular stem rotatably mounted in the corresponding tubular arm of one of said spiders and means for adjustably rotating each stem relative to its spider arm, and including a screw connecting the outer end of said spider arm and stem, said screw being arranged parallel and eccentric to the axis of the spider arm and said screw being engageable in one of a series of arcuately arranged openings in one of said ends thereby to permit of securing the beater at any desired angle.

11. A viner, comprising a screened reel having an inlet end adapted to receive vines with attached pods and an outlet end through which the straw is discharged, a shaft extending coaxially through said reel, means for driving said shaft and a beater assembly mounted on said shaft within said reel and acting to thresh and convey the vines therethrough, said beater assembly comprising a plurality of spiders mounted on said shaft, a cylindrical shell supported at the outer ends of the arms of said spiders, a beater bracket adjustably mounted on the outer end of the arms of each of said spiders and a metal beater plate secured to each of said beater brackets.

12. A viner, comprising an overhead reel mounted to rotate about a substantially horizontal axis and adapted at one end to receive the vines with the attached pods and adapted to convey said vines to its opposite discharge end, means in said reel for threshing the vines so conveyed, a pair of horizontal rolls arranged under said reel, the axes of said rolls being disposed substantially at right angles to the axis of said reel, a conveyer belt carried by said rolls and having its horizontal upper operative stretch arranged under said reel and substantially parallel with the axis thereof to receive the materials threshed out of the vines, including the chaff, means for moving the upper operative stretch of said conveyer belt in the same direction as the movement of the vines through said reel, a chaff separator receiving the material from said conveyer belt and comprising a pair of horizontal rolls carrying an endless apron, the axes of said rolls being arranged substantially at right angles to the axis of said reel, one of said second pair of rolls being arranged in advance of the other and at a lower elevation and immediately under the discharge end of said endless conveyer belt whereby the threshed materials on said conveyer belt are discharged onto the extreme lower end of the upper stretch of said endless apron, means for rotating said last pair of rolls to move said upper stretch of said endless apron upwardly and rearwardly to convey the chaff over the upper rear end of said apron, said upper rear end of said apron being arranged immediately adjacent the discharge end of said reel to discharge the chaff into the hay discharged from said reel, and means for vibrating said upper stretch of said apron to cause the materials other than said chaff to roll downwardly and forwardly over the lower end thereof.

13. A viner, comprising an overhead reel mounted to rotate about a substantially horizontal axis, and adapted at one end to receive the vines with the attached pods and adapted to convey said vines to its opposite discharge end, means in said reel for threshing the vines so conveyed, a pair of horizontal rolls arranged under said reel, one of said rolls being arranged adjacent the inlet end of said reel and the other being arranged adjacent its outlet end and the axes of said rolls being disposed substantially at right angles to the axis of said reel, a conveyer belt carried by said rolls and having its horizontal upper operative stretch arranged under said reel and substantially parallel with the axis thereof to receive the material threshed out of the vines, including the chaff, means for moving the upper operative stretch of said conveyer belt toward the discharge end of said reel, a chaff separator receiving the material from said conveyer belt and comprising a pair of horizontal out of round rolls carrying a taut endless apron, the axes of said rolls being arranged substantially at right angles to the axis of said reel, one of said second pair of rolls being arranged in advance of the other and at a lower elevation and immediately under the discharge end of said endless conveyer belt whereby the threshed materials on said conveyor belt are discharged onto the extreme lower end of the upper stretch of said endless apron, means for rotating said last pair of rolls to move said upper stretch of said endless apron upwardly and rearwardly to convey the chaff over the upper rear end of said apron, said upper rear end of said apron being arranged immediately adjacent the discharge end of said reel to discharge the chaff into the hay discharged from said reel and means for vibrating the upper stretch of the apron to cause the materials other than said chaff to roll downwardly and forwardly over the lower end thereof, including a plate arranged under substantially the full length of the upper stretch of said apron and against which the full length of said operative stretch is continuously slapped.

14. A viner, comprising an overhead reel mounted to rotate about a substantially horizontal axis and adapted at one end to receive the vines with the attached pods and adapted to convey said vines to its opposite discharge end, means in said reel for threshing the vines so conveyed, a pair of horizontal rolls arranged under said reel, one of said rolls being arranged adjacent the inlet end of said reel and the other being arranged adjacent its outlet end and the axes of said rolls being disposed substantially at right angles to the axis of said reel, a conveyer belt carried by said rolls and having its horizontal upper operative stretch arranged under said reel and substantially parallel with the axis thereof to receive the materials threshed out of the vines, including the chaff, means for moving the upper operative stretch of said conveyer belt in the same direction as the movement of the vines through said reel, a chaff separator receiving the material from said conveyer belt and comprising a pair of horizontal rolls carrying an endless apron, the axes of said rolls being arranged substantially at right angles to the axis of said reel, one of said second pair of rolls being arranged in advance of the other and at a lower elevation and immediately under the discharge end of said endless conveyer belt whereby the threshed materials on said conveyer belt are discharged onto the extreme lower end of the upper stretch of said endless apron, means for rotating said last pair of rolls to move said upper stretch of said endless apron upwardly and rearwardly to convey the chaff over the upper rear end of said apron, a blower arranged under said conveyer belt and having a discharge nozzle disposed between the discharge end of said conveyer belt and the lower end of said apron, said discharge nozzle directing a stream of air upwardly along the operative stretch of said apron thereby to aerate the materials and facilitate the separation thereof.

15. A viner, comprising a screened reel having an inlet end adapted to receive vines with attached pods and an outlet end through which the straw is discharged, a shaft extending coaxially through said reel, means for driving said shaft and a beater assembly mounted on said shaft within said reel and acting to thresh and convey the vines therethrough, said beater assembly comprising a plurality of spiders mounted on said shaft, a cylindrical shell supported at the outer ends of the arms of said spiders, said spider arms extending beyond the outer face of said shell, substantially imperforate end heads enclosing the ends of said cylindrical shell, beaters rotatably mounted directly on and supported exclusively by the outer ends of the arms of said spiders and means carried by said spider arms and directly engaging said beaters for adjustably holding said beaters in any desired position of rotation.

16. A viner, comprising a reel including a pair of end rings which are channel shaped in cross section and have their flanges extending inwardly, metal lifting ribs extending inside of said end rings and engaging the edges of the flanges thereof, a plurality of spacing members arranged in the channels of said rings, means for securing each of said spacing members to the web of its channel at two points along the periphery thereof, means for securing each of said spacing members to the corresponding end of a lifting rib, screens mounted on said ribs and enclosing said reel, means for rotatably supporting said end rings, means for feeding vines with attached pods to one end of said reel and a rotary beater assembly in said reel and coacting with said lifting ribs to thresh and convey the vines to the discharge end of said reel.

WILLIAM DE BACK.